United States Patent
Ortega

(10) Patent No.: US 12,219,905 B2
(45) Date of Patent: Feb. 11, 2025

(54) APPARATUSES AND METHODS FOR REMOVING PLANT MATERIAL

(71) Applicant: LPF Robotics, LLC, Redding, CA (US)

(72) Inventor: Edward Zavala Ortega, Watsonville, CA (US)

(73) Assignee: LPF Robotics, LLC, Redding, CA (US)

( * ) Notice: Subject to any disclaimer, the term of this patent is extended or adjusted under 35 U.S.C. 154(b) by 0 days.

(21) Appl. No.: 18/221,343

(22) Filed: Jul. 12, 2023

(65) Prior Publication Data

US 2023/0363321 A1    Nov. 16, 2023

Related U.S. Application Data

(63) Continuation of application No. 16/878,478, filed on May 19, 2020, now Pat. No. 11,737,395.

(60) Provisional application No. 62/851,463, filed on May 22, 2019.

(51) Int. Cl.
*A01G 3/08* (2006.01)
(52) U.S. Cl.
CPC .................................... *A01G 3/088* (2013.01)
(58) Field of Classification Search
CPC ..................................................... A01G 3/088
USPC ............................................................. 30/121
See application file for complete search history.

(56) References Cited

U.S. PATENT DOCUMENTS

| | | | | |
|---|---|---|---|---|
| 3,639,979 | A * | 2/1972 | Zuurveen | B26B 19/04 30/346.51 |
| 4,216,581 | A * | 8/1980 | Van Slooten | B26B 19/42 30/133 |
| 4,261,102 | A * | 4/1981 | Andriotis | B26B 19/44 30/133 |
| 4,594,778 | A * | 6/1986 | Dona | B26B 19/38 30/43.6 |

(Continued)

FOREIGN PATENT DOCUMENTS

FR    2700917 A1    8/1994

OTHER PUBLICATIONS

Bettcher Industries, Inc., Gyro Knives, https://www.bettcher.com/en/products/gyro-knives (printed on Dec. 2, 2020).

(Continued)

*Primary Examiner* — Omar Flores Sanchez

(57) ABSTRACT

A pruning system includes a cutting head comprising upper and lower cutting rings positioned along a bottom portion of one or more tubes. At least one cutting ring is adapted to rotate in a circular motion, while the other cutting ring may be adapted to remain stationary. A vacuum may be applied to suction target plant material, and the cutting head may be lowered toward the target plant material. As adjacent blades from the upper and lower cutting rings are separated in an open position, plant material may be collected in the opening defined by the adjacent blades. As the blades converge, the opening may close, and plant material collected in the opening may be severed from the plant. System variables, may be adjusted to accommodate different types of plant material. The pruning system may be used with a vision system to remove materials from plant beds in a field.

21 Claims, 8 Drawing Sheets

(56) References Cited

U.S. PATENT DOCUMENTS

| | | | | |
|---|---|---|---|---|
| 4,670,982 | A * | 6/1987 | Kim | B26B 19/44 |
| | | | | 30/133 |
| 4,899,442 | A * | 2/1990 | Horii | B26B 19/44 |
| | | | | 30/34.2 |
| 4,916,813 | A * | 4/1990 | Elia | A01D 34/828 |
| | | | | 30/276 |
| 5,438,753 | A * | 8/1995 | Stepan | H02G 1/1297 |
| | | | | 30/90.1 |
| 5,444,914 | A * | 8/1995 | Dekker | B26B 19/141 |
| | | | | 30/346.51 |
| 5,664,332 | A * | 9/1997 | Whited | B26B 25/002 |
| | | | | 30/276 |
| 9,615,588 | B2 * | 4/2017 | Karubian | A22B 5/168 |
| 10,537,356 | B2 * | 1/2020 | Esarey | B23P 15/406 |
| 11,654,589 | B2 * | 5/2023 | Hall | B26B 25/002 |
| | | | | 30/276 |
| 11,717,981 | B2 * | 8/2023 | Levsen | A22B 5/165 |
| | | | | 30/124 |
| 11,737,395 | B2 | 8/2023 | Ortega | |
| 11,878,440 | B1 * | 1/2024 | Mercier | B27B 5/02 |
| 2004/0088864 | A1 * | 5/2004 | Whited | B26B 25/002 |
| | | | | 30/276 |
| 2006/0174487 | A1 * | 8/2006 | Andis | B26B 19/382 |
| | | | | 30/34.05 |
| 2006/0225287 | A1 * | 10/2006 | Mack | A01G 3/053 |
| | | | | 30/208 |
| 2007/0124936 | A1 * | 6/2007 | Okabe | B26B 19/145 |
| | | | | 30/43.6 |
| 2009/0277012 | A1 * | 11/2009 | Mikula | B26B 19/44 |
| | | | | 30/41.6 |
| 2015/0230402 | A1 * | 8/2015 | Grande | A01D 34/90 |
| | | | | 30/276 |
| 2016/0082607 | A1 * | 3/2016 | Shimizu | B26B 19/143 |
| | | | | 30/43.6 |
| 2016/0158947 | A1 * | 6/2016 | Pragt | B26B 19/14 |
| | | | | 30/43.6 |
| 2020/0367440 | A1 * | 11/2020 | Ortega | B26D 1/38 |
| 2022/0312683 | A1 * | 10/2022 | Spagnolo | B23D 45/003 |
| 2023/0158587 | A1 * | 5/2023 | König | B23D 49/162 |
| | | | | 30/124 |

OTHER PUBLICATIONS

Stihl, RG-KM Reciprocator Attachment, https://www.stihlusa.com/products/multi-task-tools/kombisystem-attachments/rgkm/ (printed on Dec. 2, 2020).

* cited by examiner

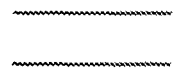
FIG. 6A
FIG. 6B
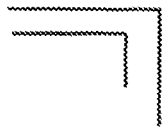
FIG. 6C

APPARATUSES AND METHODS FOR REMOVING PLANT MATERIAL

CROSS REFERENCE TO RELATED APPLICATIONS

This application is a continuation of U.S. patent application Ser. No. 16/878,478, filed on May 19, 2020, which claims the benefit of U.S. Provisional Application Ser. No. 62/851,463, filed on May 22, 2019. The subject matter of the above-referenced applications are herein incorporated by reference in their entirety.

FIELD OF THE INVENTION

The present invention relates generally to apparatuses and methods that are useful for the management of plant material in plant beds and crop fields, and more particularly, apparatuses and methods that are useful for removing leaves, runners, stems, unwanted fruit, and other structures from strawberry plants and other plants with foliage.

BACKGROUND

Strawberry plants are widely grown with strawberry fruit being produced yearly in the millions of tons. Strawberry plants may be planted in the ground and remain in the ground to allow growth for a number of months before the fruit is harvested. During their growth, strawberry plants produce a number of different plant structures, including leaves, a root system, a crown, runners (or stolons), and flowering fruit stalks with strawberry flowers and fruit. Generally, the leaves engage in photosynthesis, while the roots absorb water and nutrients from the soil to facilitate plant growth. The crown produces runners that can provide daughter plants and flowering stalks from which strawberry fruit may be picked.

Growing, maintaining, and harvesting strawberries can be labor, time, and resource-intensive undertakings. In some regions, a strawberry plant may stay in the ground for approximately fourteen months. During this time, the plants can produce substantial growth, including substantial growth of leaves, stems, runners, and other plant material. Because the fruit is often found among the often dense foliage that has grown around it, the fruit must be located and separated from the surrounding foliage before it can be removed from the plant. In some instances, strawberries may be harvested twice a week for nine months. Removing the strawberries from the plant during this period, generally by hand-picking, requires significant amounts of labor, time, and resources to sort through the leaves, runners, and other plant material that have accumulated during the preceding months of plant growth. Harvesting the strawberry fruit may become more cumbersome and additional resources may be required as the season progresses due, at least in part, to the need to manage the leaves, runners, and other foliage that may have accumulated around the fruit during the growth season.

In addition, the growth and accumulation of plant structures around the fruit with time can result in large strawberry plants with substantial foliage. The development of stronger root systems in strawberry plants also introduce plants with larger plant canopies. Given their eventual size, strawberry plants may be spaced apart during planting to allow room for the future plant material. As such, field space must be allocated to accommodate the eventual growth.

Another concern is field sanitation. The growth of foliage also may require significant resources to maintain strawberry plants and ensure healthy growth. The accumulation of strawberry plant leaves and other plant material may increase the risk of unwarranted conditions that may be detrimental to the plants. For instance, the accumulation of leaves and other plant material may increase the presence of insects, the growth of fungus such as *botrytis*, mold, mold spores, rot, soil-borne pathogens, and other conditions that may adversely affect the strawberry fruit. Additional field sanitation measures may be required. The accumulation of foliage may also call for the removal of old growth for a more open, more manageable, and better ventilated plant canopy.

Accordingly, it would be desirable and advantageous to provide apparatuses and methods to facilitate the care and harvesting of strawberry plants. Additionally, it would be desirable and advantageous to provide systems capable of facilitating the pruning of unwanted materials from strawberry plants, including systems capable of removing plant leaves, runners, other foliage, and unwanted plant material from strawberry plants. In some instances, it also may be desirable and advantageous to provide systems that can facilitate strawberry picking and the maintenance of strawberry plants.

BRIEF SUMMARY OF THE INVENTION

Described are apparatuses, methods, and systems that can help to reduce the labor needed to harvest fruit, such as strawberry fruit, by maintaining the canopy size of plants from which the fruit grows. At least some leaves, stems, runners, and other plant material may be removed from the plant so as to improve the visibility of the fruit and to facilitate the harvesting of the fruit, thereby increasing the productivity of each harvester. Plant sizes, including plant canopy sizes, may become more manageable, while plant ventilation and sun exposure may be improved. In addition, the use of automated harvesting using vision systems with cameras and other vision apparatuses may be facilitated by maintaining plant canopies and improving the ability of the systems to detect fruit. The presence of insects, mold, fungi, and conditions that may be detrimental to plant growth may be reduced. As a result, less pesticide and fungicide applications, particularly those that depend on full spray coverage of the fruit and foliage, may be required, and field sanitation may be improved. The cleaning of the plant material also may help reduce the resources needed for removing weeds from plant beds. In addition, the apparatuses, methods, and systems may allow for increased plant density in the field, thereby increasing crop yield.

An apparatus for pruning plants, including strawberry plants and other plants with foliage, is described. In one embodiment, the apparatus comprises a tube assembly and a cutting head assembly connected to the tube assembly. The tube assembly is adapted to connect to a vacuum source. The cutting head assembly comprises an upper blade and a lower blade disposed below the upper blade. The upper blade comprises an upper blade edge. The lower blade comprises a lower blade edge. Adjacent upper and lower blade edges define an opening dimensioned to allow the entry of plant material therethrough. The adjacent upper and lower blades edges are adapted to converge to substantially close the opening and sever at least a portion of the plant material when suction from the vacuum source is applied and at least one of the upper or lower blades is rotated.

In some embodiments, one of the upper or lower blades may be rotatable and the other of the upper or lower blades may be stationary. The upper blade may be rotatable and the lower blade may be stationary. The cutting head assembly may comprise a rotatable inner cutting tube and a stationary outer cutting tube. The upper blade may be disposed at a bottom portion of the inner cutting tube, and the lower blade may be disposed at a bottom portion of the outer cutting tube. A mounting band may connect the upper blade to the inner cutting tube. The lower blade may extend from a base member that is adapted to fit around an end portion the outer cutting tube. The tube assembly may be adapted to rotate around a longitudinal axis, and the upper and lower blades are angled relative to the longitudinal axis. The apparatus also may comprise a vision system in electronic communication with the cutting head assembly. The vision system may be programmed to allow for the lowering of the cutting head assembly and rotation of the upper blade when particular plant material has been identified. The apparatus may be fitted with a comb that is adapted to separate material based on height. The apparatus may further comprise a knife guard adapted to protect the cutting head assembly.

Also disclosed is a method of removing plant material. In one embodiment, the method comprises the steps of identifying plant material to be removed from one or more plants; applying suction to the plant material using a tube assembly connected to a vacuum source; and lowering a cutting head assembly that is coupled to the tube assembly toward the suctioned plant material. The cutting head assembly comprises an upper blade and a lower blade disposed below the upper blade. The method further comprises the steps of positioning at least a portion of the plant material through an opening defined by adjacent edges of the upper and lower blades; rotating at least one of the upper or lower blades of the cutting head assembly to allow the adjacent edges of the upper and lower blades to converge; and removing at least a portion of the plant material from the plant when the upper and lower blade edges converge.

In some embodiments of the method, the step of rotating at least one of the upper or lower blades of the cutting head assembly to allow the adjacent edges of the upper and lower blades to converge may comprise rotating the lower blade, while allowing the upper blade to remain stationary. The step of rotating at least one of the upper or lower blades of the cutting head assembly to allow the adjacent edges of the upper and lower blades to converge may comprise rotating the upper blade, while allowing the lower blade to remain stationary. The cutting head assembly may comprise a rotatable inner cutting tube and a stationary outer cutting tube. The upper blade may be disposed at a bottom portion of the inner cutting tube, and the lower blade may be disposed at a bottom portion of the outer cutting tube. A mounting band may connect the upper blade to the inner cutting tube. The lower blade may extend from a base member that is adapted to fit around an end portion of the outer cutting tube. The tube assembly may be adapted to rotate around a longitudinal axis, and the upper and lower blades are angled relative to the longitudinal axis. In addition, the step of identifying plant material to be removed from one or more plants may comprise: identifying plant material to be removed using a vision system in electronic communication with the cutting head assembly. The step of lowering a cutting head assembly that is connected to the tube assembly toward the suctioned plant material may comprise: lowering the cutting head assembly when particular plant material has been identified using the vision system. The cutting head assembly may be fitted with a comb that is adapted to separate based on height. A knife guard may be adapted to protect the cutting head assembly.

Further described is an apparatus having an upper cutting ring and a lower cutting ring that is dimensioned to fit below the upper cutting ring. The upper cutting ring comprises a plurality of upper cutting blades. The lower cutting ring comprises a plurality of lower cutting blades. Adjacent upper and lower blades define an opening dimensioned to allow the entry of plant material between the adjacent upper and lower cutting blades. Further, the adjacent upper and lower cutting blades are adapted to converge to substantially close the opening and sever at least a portion of the plant material when at least one of the upper or lower cutting rings is rotated.

In some embodiments, one of the upper or lower cutting rings may be rotatable and the other of the upper or lower cutting rings may be stationary. The upper cutting ring may be rotatable and the lower cutting ring may be stationary. The upper cutting ring may extend from a rotatable inner cutting tube, and the lower cutting ring may extend from a stationary outer cutting tube positioned around the inner cutting tube. The upper cutting ring may comprise a mounting band adapted to connect the upper cutting ring to the inner cutting tube. The lower cutting ring may comprise a base member adapted to fit around an end portion the outer cutting tube. The upper and lower cutting blades may be angled relative to the planes formed by opposing outside edges of the upper and lower cutting rings, respectively. The upper and lower cutting rings may be in fluid communication with an elongated tube adapted to connect to a vacuum source. The apparatus may be in electronic communication with a vision system. The upper and lower cutting rings may be connected to a robotic arm that is adapted to raise and lower the upper and lower cutting rings toward plant material in response to information obtained from the vision system.

BRIEF DESCRIPTION OF THE SEVERAL VIEWS OF THE DRAWINGS

Embodiments of the present invention may be described with reference to the accompanying drawings.

FIGS. 6A through 6C illustrate schematically in side view different blade orientations for a plant cutting head, in accordance with different embodiments of the present invention.

DETAILED DESCRIPTION OF THE INVENTION

Figure 1A:
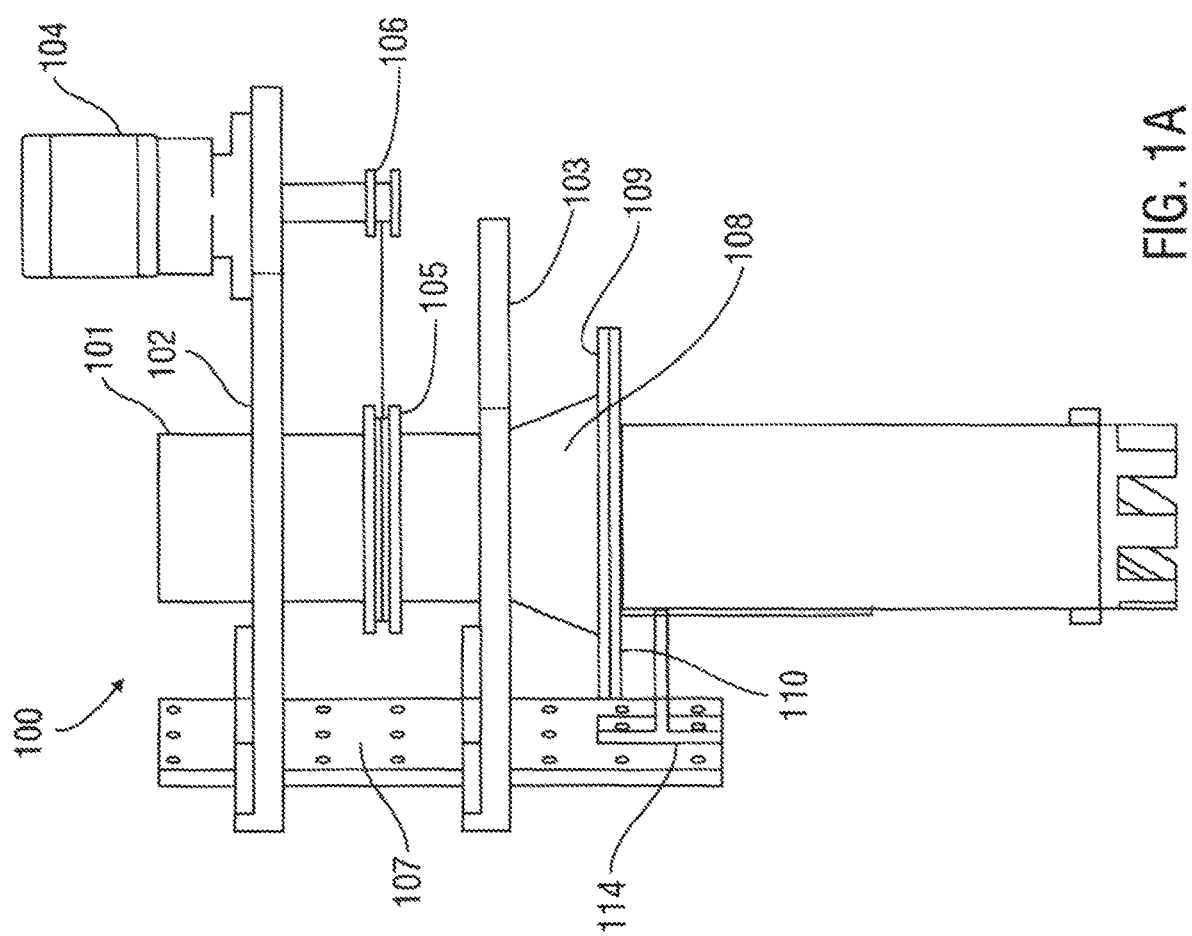
FIG. 1A illustrates schematically a side view of various components of an example of a plant pruning system, in accordance with an embodiment of the present invention. The system comprises a tubular member with a set of stationary bearings around which a pulley can be attached. A hydraulic motor is connected to the tubular member. The system also includes an inner cutting tube and an outer cutting tube.

As used herein, the terms "comprises," "comprising," "includes," "including," "has," "having," or any other variation thereof, are intended to cover a non-exclusive inclusion. For example, processes, methods, articles, or apparatuses that comprise a list of elements are not necessarily limited to only those elements but may include other elements not expressly listed or inherent to such processes, methods, articles, or apparatuses. Unless expressly stated to the contrary, "or" refers to an inclusive "or" but not to an exclusive "or." For example, a condition A or B is satisfied by any one of the following: A is true (or present) and B is false (or not present), A is false (or not present) and B is true (or present), and both A and B are true (or present). Further, unless expressly stated to the contrary, "at least one of" elements A or B refers to at least one of the identified elements. For example, a condition "at least one of A or B" is satisfied by any one of the following: A is true (or present) and B is false (or not present), A is false (or not present) and B is true (or present), and both A and B are true (or present).

Also, use of "a" or "an" is employed to describe the elements and components of the invention. This is done merely for convenience and to give a general sense of the invention. This description includes one or at least one and the singular also includes the plural unless it is obvious that it is meant otherwise.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or work characteristics may be combined in any suitable manner in one or more embodiments.

Unless otherwise defined, technical and scientific terms used herein have the same meaning as commonly understood by one of ordinary skill in the art to which this invention belongs. Although methods that are similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, materials, methods, and examples are illustrative only and not intended to be limiting.

In the following description, numerous specific details, such as the identification of various system components, are provided to understand the embodiments of the invention. One skilled in the art will recognize, however, that embodiments of the invention can be practiced without one or more of the specific details, ordinary methods, components, materials, etc. In still other instances, well-known structures, materials, or operations are not shown or described in detail to avoid obscuring aspects of various embodiments of the invention.

I. General System Structures

A system for the removal of plant material, such as leaves, stems, plant runners, and unwanted fruit, for plant management applications is described. A wide range of applications may be addressed using the system described herein. These include but are not limited to the removal of plant material from strawberry plants and other plants with foliage. The pruning system may be used alone or in connection with one or more vision systems to facilitate the harvesting, management, and care of a wide variety of plant beds.

Figure 1D:
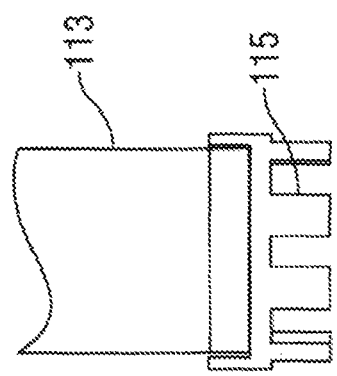
FIG. 1D illustrates schematically a side view of a section of the outer cutting tube with the cutting blades fitted around an end portion of the outer cutting tube.
Figure 1C:
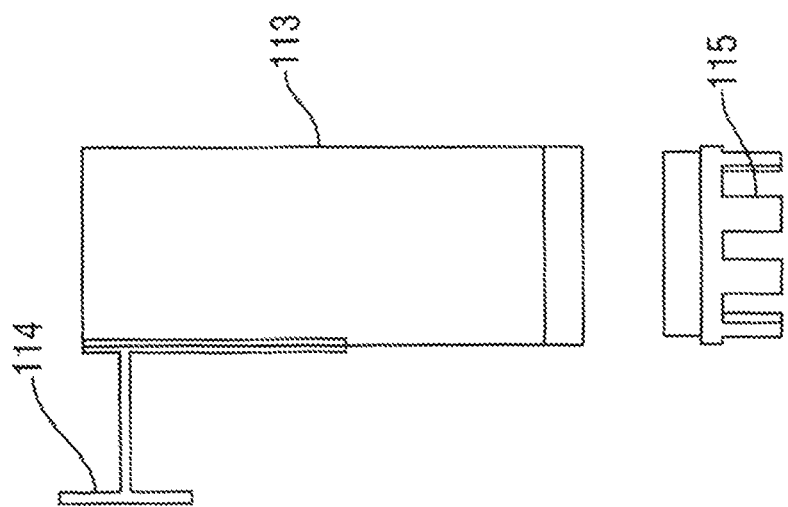
FIG. 1C illustrates schematically a side view of the outer cutting tube comprising a plurality of cutting blades that may be disposed along an end portion of the outer cutting tube.
Figure 1B:
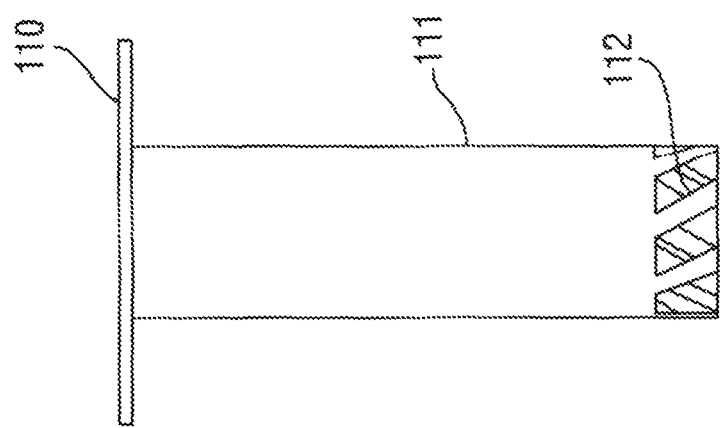
FIG. 1B illustrates schematically a side view of the inner cutting tube comprising a plurality of cutting blades that may be disposed at an end portion of the inner cutting tube.

Referring to FIGS. 1A through 1D, schematic side views of various components of an example of a plant pruning system are shown, in accordance with an embodiment of the present invention. As illustrated in FIG. 1A, the assembled system 100 includes a tubular member 101 with an upper plate 102 and lower plate 103. The upper plate is connected to a hydraulic motor 104 that runs a pulley system with bearings 105 and 106. Other types of motors known in the art for powering rotary motion, such as electric motors, also may be used. The upper and lower plates are connected to a mounting plate 107, which may be attached to a robotic arm that raises and lowers the system (not shown). The tubular member includes a beveled section 108 with a flange 109 around which a complementary flange 110 from an inner cutting tube may be fitted. An outer cutting tube is positioned around the inner cutting tube and connected to the mounting plate 107 through the use of a bracket 114. As illustrated in FIG. 1B, the inner cutting tube 111 includes cutting blades 112 along a bottom portion of the tube. As illustrated in FIG. 1C, the outer cutting tube 113 is attached to a bracket 114 that connects the outer cutting tube to the mounting plate 107. The outer cutting tube includes cutting blades 115 along a bottom portion of the tube.

When the system is operated, the motor powers the rotation of the tubular member around a longitudinal axis that is substantially perpendicular to the ground surface above which the system may be positioned (not shown), thereby rotating the inner cutting tube that is connected to the tubular member. The inner cutting tube with cutting blades (e.g., forming the rotating head) is thus allowed to rotate, while the outer cutting tube with the cutting blades (e.g., forming the stationary head) remains stationary. In some embodiments, the cutting blades of the inner cutting tube comprise upper cutting blades, and the cutting blades of the outer cutting tube comprise lower cutting blades.

It will be appreciated that the cutting blades of the inner and outer cutting tubes may be positioned in a variety of different ways and orientations, and adapted to rotate at different speeds and directions relative to each other. For instance, in a preferred embodiment, the cutting blades of the inner cutting tube comprise rotatable upper cutting blades, and the cutting blades of the outer cutting tube comprise stationary lower cutting blades. In other embodiments, both the upper and lower cutting blades may both rotate, for example, each in a different direction relative to the other. In yet other embodiments, the cutting blades of the inner cutting tube may comprise stationary upper cutting blades, and the cutting blades of the outer cutting tube comprise rotating lower cutting blades.

A vacuum tube may be connected to the tubular member, and the vacuum tube may be connected to a pump or other vacuum source that creates a vacuum through the tubular member. The vacuum tube may be connected to the tubular member by fitting the tube around the top end of the tubular member, or by using clips, bolts, screws, hooks, latches, fittings, brackets, adhesives, connection members, base members, mounting structures, caps, intermediate structures, and/or other connecting members known in the art for connecting tubular structures. The vacuum may be used to draw in plant material through the tubular member using suction and a motor that powers the pump. At least a portion of the plant material may be cut using the cutting blades of the inner and outer cutting tubes.

In preferred embodiments, the cutting blades comprise removeable cutting tips that can be detached from the apparatus and replaced to facilitate system customization, component replacement, component removal, access, and/or cleaning. For example, as shown in FIG. 1B, the rotatable, inner cutting tube with inner cutting blades may be removed from the apparatus and replaced with a different cutting tube with different cutting blades. As shown in FIGS. 1C and 1D, the outer cutting blades of the stationary, outer cutting tube may be located on a bottom base member. The bottom base member may be dimensioned to fit around a bottom portion of the outer cutting tube. The base member may be removed and replaced with another base member that includes different cutting blades.

When used in a field of strawberry plants, for example, plant material to be removed is identified, and the cutting tubes of the pruning system may be lowered toward one or more strawberry plants. When the motor is activated to power the vacuum and create a vacuum source, at least some plant material may be lifted toward and through the tubular member, and at least portions of the plant material (unwanted strawberry leaves or runners, for instance) may be positioned in the spaces formed by adjacent blade edges from the inner and outer cutting tubes. As one or more blades is rotated and adjacent blade edges from the inner and outer cutting tubes are allowed to converge, closing the spaces, plant material may be removed from the plant. The system, including the cutting tubes, may be raised, moved laterally across a plant bed, and positioned over other plants or other plant material and then lowered to allow for a similar stamping motion across a field or at another location. As a non-limiting example, the cutting tubes can range from approximately 2 to 8 inches in diameter.

Figure 2:
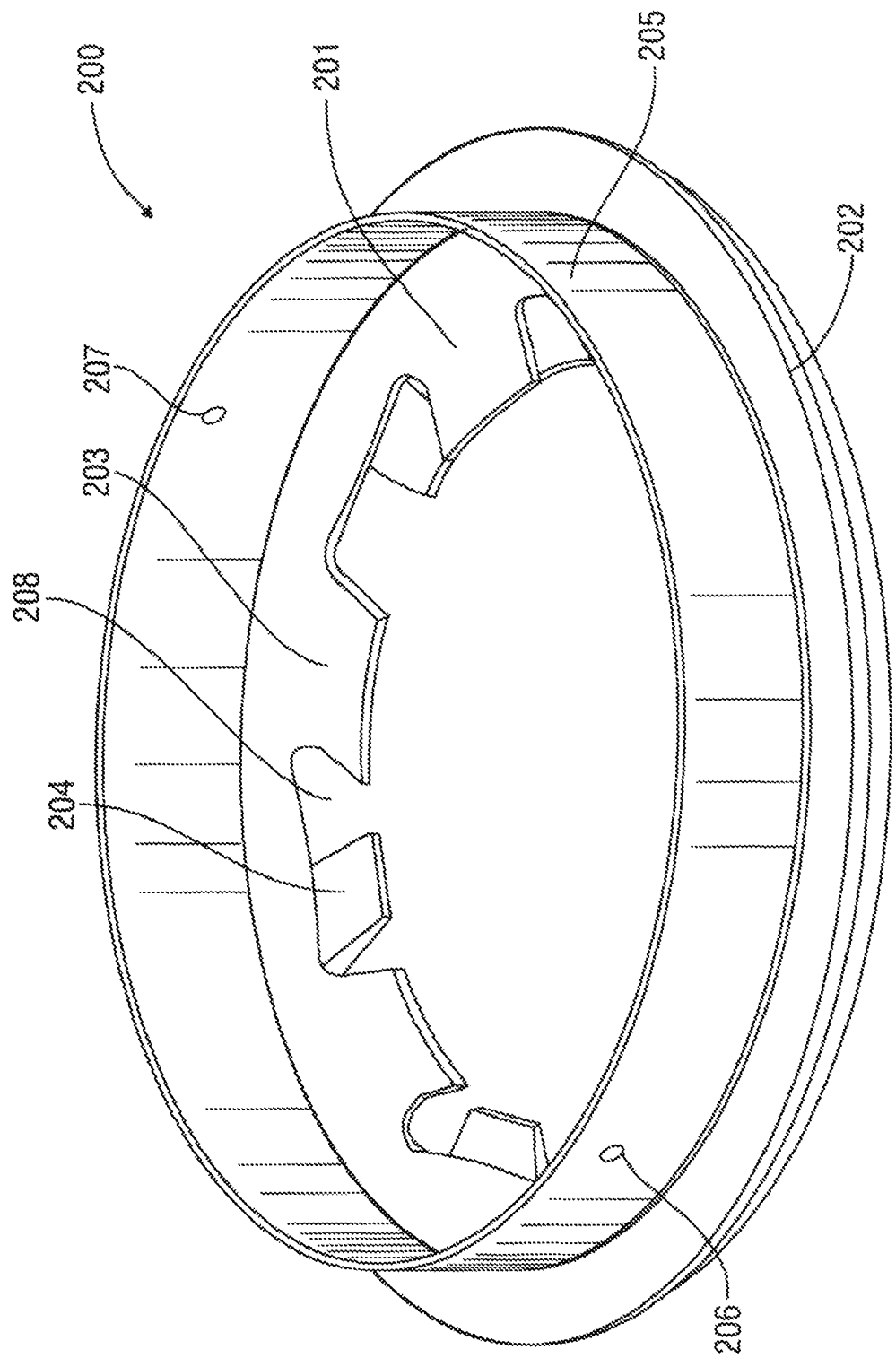
FIG. 2 illustrates schematically an angled side view of various components of an example of a plant cutting head, in accordance with an embodiment of the present invention. The plant cutting head includes a set of cutting rings that define a plurality of slots when paired blades are in the open position. At least a portion of the blades are angled relative to a plane defined by opposite edges of the respective cutting rings.
Figure 3:
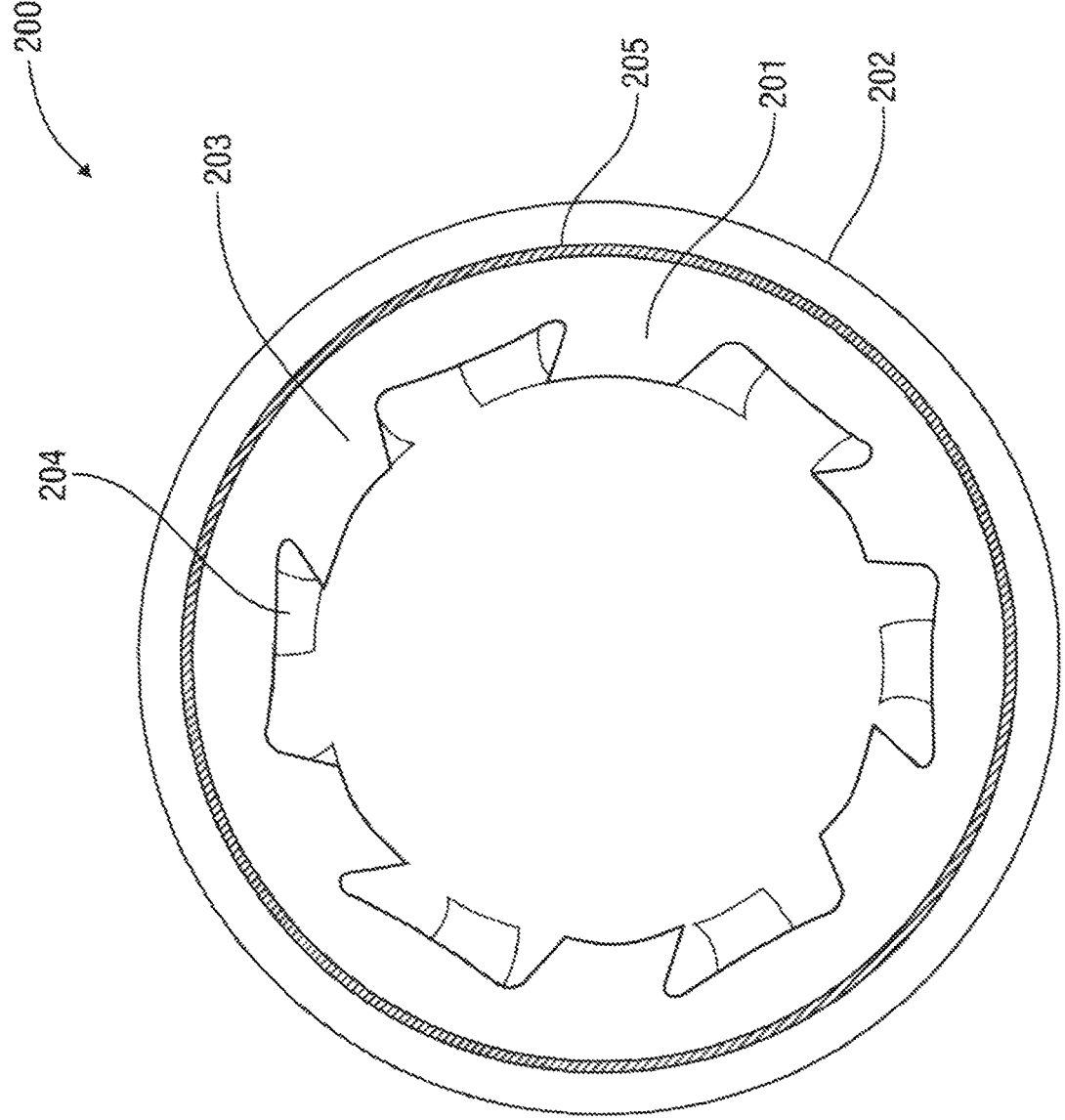
FIG. 3 illustrates schematically a top view of various components of an example of a plant cutting head, in accordance with an embodiment of the present invention.
Figure 4:
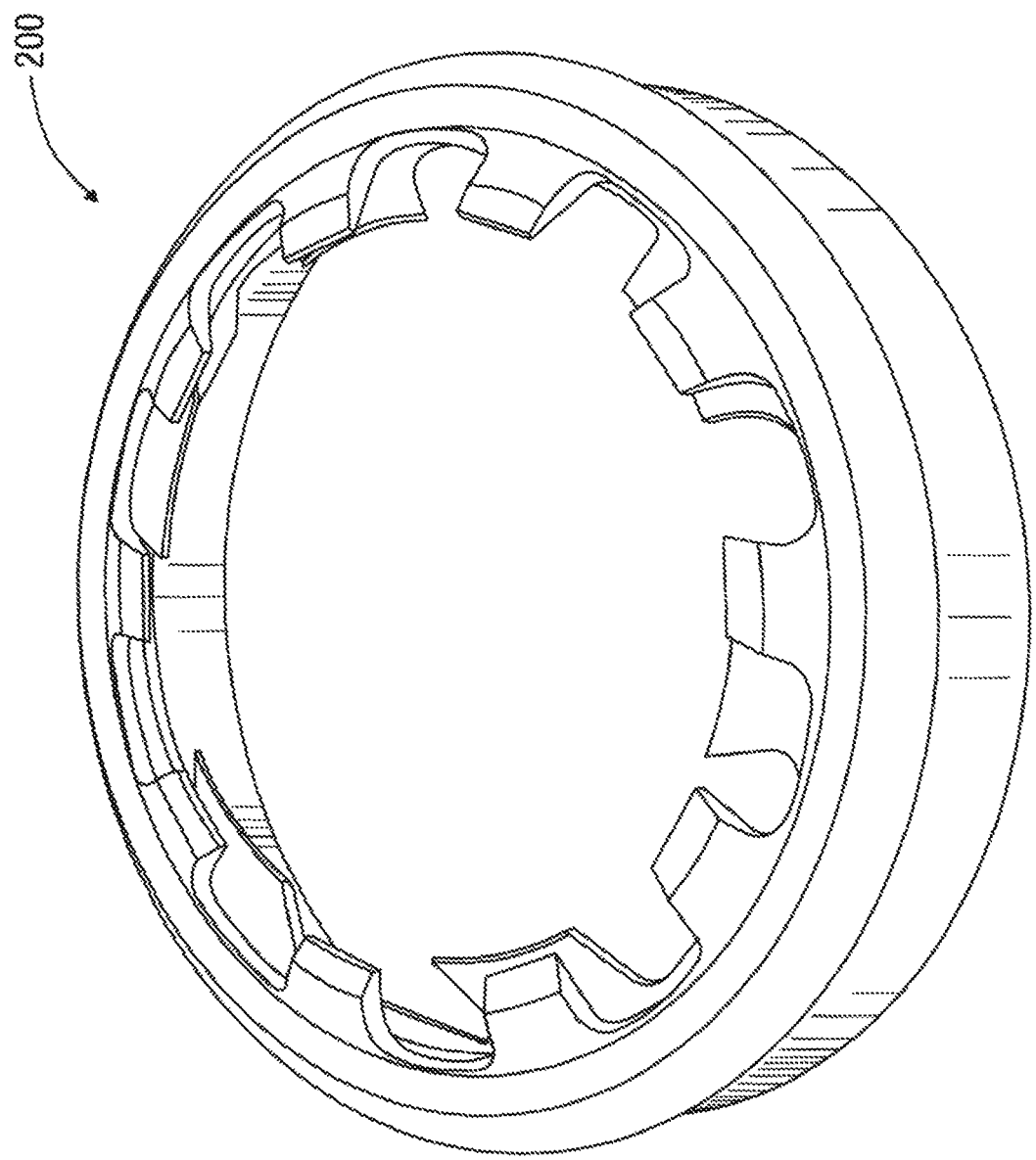
FIG. 4 illustrates schematically an angled bottom view of various components of an example of a plant cutting head, in accordance with an embodiment of the present invention.

Referring to FIGS. 2 though 4, various components of a preferred embodiment of a plant cutting head 200 are shown schematically in different views according to an embodiment of the present invention. The plant cutting head includes upper and lower cutting rings 201 and 202, respectively, each with a plurality of serrated edges or cutting blades 203 and 204. In this embodiment, the upper cutting ring includes a substantially circular mounting band 205 that extends from an upper face of the upper cutting ring. The upper cutting ring with the mounting band may be a one-piece structure that forms a substantially cylindrical open ended base structure. Alternatively, the mounting band may be a separate piece that is attached to a portion of the upper cutting ring. Screws (not shown) or other fastening members may be placed through holes 206 and 207 in the mounting band to attach the upper cutting ring to an inner cutting tube. The lower cutting ring may be connected to, integrated with, or comprise a section of one of more base members (not shown), which can be fit around a bottom portion of an outer cutting tube.

In an "open" position, adjacent cutting blades (and the edges of the adjacent cutting blades) from the upper and lower cutting rings are separated by a lateral space to form a notch 208. The notches in the cutting rings form openings where leaves, stems, or other plant material can be positioned and through which the leaves, stems, or other plant material can be lifted; for instance, with the aid of suction from a vacuum tube (not shown). In a preferred embodiment, the notch can comprise an opening with rounded edges sized to help secure plant material, such as one or more strawberry leaves, stems, or runners, between the blades of the cutting ring. The upper and lower cutting rings are paired, in some instances, one laid over or nested within the other, and positioned so that one of the cutting surfaces may rotate (for example, the upper cutting ring), while the other cutting surface (for example, the lower cutting ring) remains stationary. When so operated, adjacent blades from each of the cutting rings are allowed to converge until they slide against each other. In the "closed" position, the cutting blades eventually converge to close the lateral space between the blades and to cut at least some of the material.

In the embodiment shown, the plant cutting head device includes cutting rings that are generally circular in shape, and the cutting blades extend through an interior portion of the cutting rings, toward the center of the cutting rings. For example, the upper cutting ring may form part of or extend from a rotatable inner cutting tube (directly or through the use of intermediate connection structures), while the lower cutting ring may form part of or extend from part of a stationary outer cutting tube (directly or through the use of intermediate connection structures). It will be appreciated, however, that the cutting rings need not be generally circular in shape and can comprise a variety of different shapes and sizes. In addition, the notches in each of the cutting rings need not include rounded edges on each side. Any of a multitude of complimentary shapes allowing for the collection and cutting of plant material and well known to the ordinary artisan could be used. For instance, the notches can be in a range of customized shapes (e.g., circular, oval, generally round, generally straight, hooked, or irregular), configurations, and sizes to fit different applications. Various cutting rings and notches of varying dimensions may be used to accommodate different design considerations, such as different apparatus widths, lengths, and heights, desired plant collection and cutting areas, case of fabrication, and the particularities of the landscaped area in which the pruning system is to be used.

In addition, it will be appreciated that one or both of the cutting rings may be adapted to rotate in a multitude of different ways known in the art for substantially closing the opening and severing material positioned through the opening. As discussed above, the blades from the upper cutting ring may rotate, and the blades from the lower cutting ring may remain stationary. In other embodiments, blades from both the upper and lower cutting rings may both rotate, for example, each in a different direction relative to the other. In yet other embodiments, the blades from the lower cutting ring may rotate, and the cutting blades of the upper ring may remain stationary.

The structures and assemblies used to integrate the cutting rings (having upper and lower cutting blades) with the cutting tubes are provided in these examples for illustration purposes. It will be understood that the upper and lower cutting rings (with upper and lower cutting blades) may be integrated with inner and outer cutting tubes, respectively, through the use of a wide variety of structures and assemblies for the secure integration of components in pruning devices. The structures and assemblies used may vary depending on different design considerations, such as: case of fabrication and use, manufacturing considerations, the dimensions of the components, the desired weights for the pruning system, the desired plant coverage capacity, desired plant removal rates for the system, the intended plant and field application, and/or the characteristics of the materials used for construction.

For example, in some embodiments, the upper cutting ring can form part of the inner cutting tube such that it is a unitary structure. Alternatively, the upper cutting ring and inner cutting tube may be formed from multiple components, each attached to the other, either directly or indirectly, by any means for securely attaching pruning system components. For instance, the upper cutting ring and inner cutting tube may be attached through the use of one or more clips, bolts, additional screws, hooks, latches, fittings, brackets, adhesives, base members, mounting bands, mounting structures, caps, cutting tips, intermediate structures, and/or other connecting members. In yet other embodiments, the upper cutting ring of the system may be formed from a combination of elongated cutting tube sections, base members, attachment means, and/or separate intermediate assemblies that are used together. In preferred embodiments, the upper cutting ring may be removed from the inner cutting tube to facilitate replacement of the cutting blades (e.g., after wear or when different types of blades are desired), repair, and maintenance.

Similarly, in some embodiments, the lower cutting ring can form part of the cutting tube such that it is a unitary structure. In other embodiments, the lower cutting ring and outer cutting tube can be separate components, each attached to the other, either directly or indirectly, by any means for securely attaching pruning system components. For instance, the lower cutting ring and outer cutting tube may be attached through the use of one or more clips, bolts, screws, hooks, latches, fittings, brackets, adhesives, base members, mounting bands, mounting structures, caps, cutting tips, intermediate structures, and/or other connecting members. In yet other embodiments, the lower cutting ring of the system may be formed from a combination of elongated cutting tube sections, base members, attachment means, and/or separate intermediate assemblies that are used together. In preferred embodiments, the lower cutting ring may be removed from the outer cutting tube to facilitate replacement of the cutting blades (e.g., after wear or when different types of blades are desired), repair, and maintenance.

Figure 5:
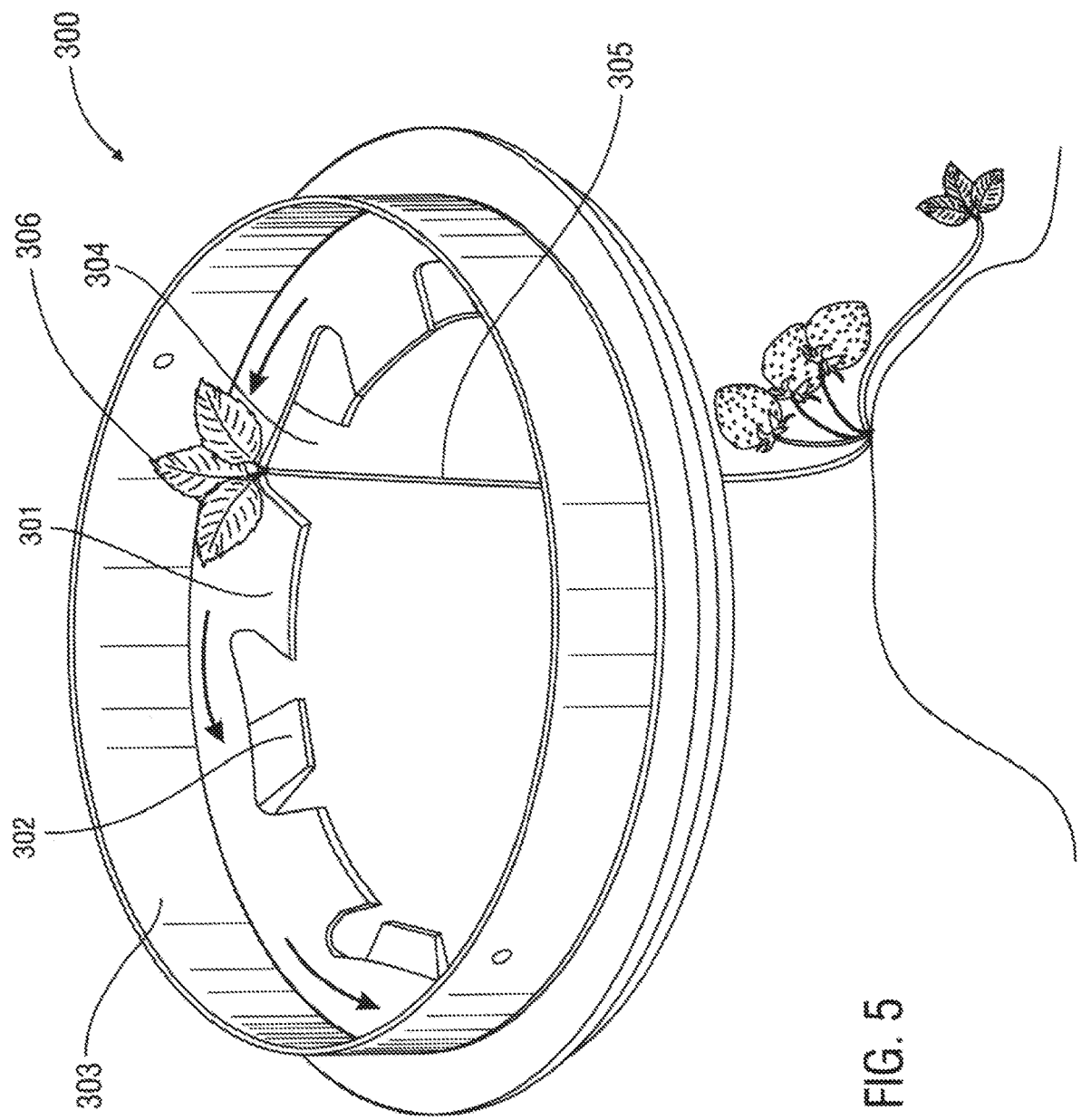
FIG. 5 illustrates schematically an angled side view of various components of an example of a plant cutting head positioned above a strawberry plant, in accordance with an embodiment of the present invention.

FIG. 5 illustrates the cutting of a strawberry runner using a plant cutting head 300. In this embodiment, the cutting head comprises cutting blades 301 and 302 that extend toward the interior of the upper and lower cutting rings at an approximately 45-degree angle from a plane defined by opposing external edges of the respective cutting ring. The plant cutting head also includes a mounting band 303 that extends from an upper face of the upper cutting ring. The mounting band can be used to attach at least a portion of the upper cutting ring to one or more elongated tubes (such as an inner cutting tube), through the placement of screws (not shown) or other connection means through screw holes located on one or more sides of the mounting band. The lower cutting ring may be integrated with or fit around a bottom portion one or more elongated tubes (such as an outer cutting tube).

The cutting blades from the upper and lower cutting rings define openings 304 through which plant material, including a stem portion 305 and leaf portion 306, can be drawn toward a vacuum tube (not shown) that is coupled to the cutting head. The plant material may be lifted by the vacuum and positioned through the opening. As at least one of the cutting rings rotates (e.g., the upper cutting ring), the speed of the rotating cutting ring and the speed of the vacuum help to draw the plant material through the vacuum tube. In some embodiments, there may be some pulling of the plant material upward before the cutting blades converge and eventually cut the stem portion to remove the leaf of the strawberry plant.

During operation of the system, target plant material to be removed is identified. An apparatus with the plant cutting head is positioned above the target plant material, for example, the strawberry runner and lowered toward the plant material. The vacuum source is applied to help lift the leaves and stem portions of the runner and allow for the collection of the stem portion of the runner in an open space between adjacent blades from the upper and lower cutting rings. A motor powers the rotation of at least one of the cutting rings (e.g., the upper cutting ring). The other cutting ring (e.g., the lower cutting ring) may remain stationary. As at least one cutting ring is rotated (in some instances, while plant material is being lifted upward), adjacent blades from the upper and lower cutting rings converge to substantially close the space and sever the strawberry runner from the plant. In a preferred embodiment, the severed strawberry runner is suctioned through the vacuum tube (not shown) and removed from the area.

II. Additional Features

Cutting Blades

As illustrated schematically in FIGS. 6A through 6C, the cutting ring may include cutting blades oriented at a variety of different angles relative to the outer edges of the cutting ring (and the longitudinal axis of rotation of the tubular member to which the cutting ring is attached). In general, more horizontally oriented cutting blades or less angled cutting blades—i.e., less angled relative to the plane defined by opposing external edges of the cutting ring on the blades are located—will allow more of the stem or plant to travel before it is cut. Cutting blades oriented at steeper angles—i.e., at a higher angle relative to a plane defined by opposing edges of the cutting ring on the blade are located-will allow plant material to more quickly fall into the notch and be cut from the plant.

It will be appreciated that different plant cutting heads may be incorporated to accommodate the removal of different types of plant material. As illustrated schematically in FIG. 6A, for example, the cutting head may include cutting blades that comprise a substantially straight shape that extends substantially perpendicularly from a plane defined by opposing outer edges of the cutting ring (and straight toward the ground, along the same direction from the longitudinal axis about which the vacuum tube is configured to rotate). The cutting blades in this embodiment may allow for material to be severed from the plant before it has traveled significantly toward the vacuum tube (or been lifted significantly by the vacuum). This may be useful for severing plant material that may be shorter or located closer to the ground.

In other embodiments, as illustrated schematically in FIG. 6B, the cutting blades may comprise a substantially angled shape that extends toward the interior of the cutting ring at an angle greater than zero degrees. For instance, the cutting blades may extend toward the interior of the cutting ring at an approximately 45-degree angle from a plane defined by opposing external edges of the cutting ring. This configuration may allow for plant material to travel more (or be lifted more) before it is cut. For example, it may be useful for removing runners with long stems from strawberry plants. In yet other embodiments, the cutting blades may comprise cutting blades that extend toward the interior of the cutting ring and are substantially perpendicular to a plane defined by opposing outer edges of the cutting ring, as illustrated schematically in FIG. 6C. This configuration may allow for even more plant material to travel (or be lifted) before it is cut. The system may use a variety of different cutting blades disposed at other angles relative to the plane defined by opposing external edges of the cutting ring on which the blade is located (and relative to the longitudinal axis about which the vacuum tube is configured to rotate).

In preferred embodiments, the cutting blades, the plant cutting heads, cutting rings, and/or cutting tubes, or sections of the cutting blades, the plant cutting heads, cutting rings, and/or cutting tubes may be removable to facilitate customization, component replacement, component removal, access, and/or cleaning. In some applications, a pruning system may be used with a variety of interchangeable cutting rings or cutting tips, and each of the cutting rings can comprise a plurality of cutting blades that are oriented to allow for particular cutting characteristics, such as the ability to remove particular plant material (e.g., runners or leaves). In other applications, the cutting blades, plant cutting heads, and/or the cutting rings may be attached to one or more tubular structures, and the cutting surfaces may be removed and replaced by removing and replacing the tubular structures from the device. In yet other embodiments, the cutting surfaces may be removed and replaced through the use of a combination of different cutting rings, cutting tips, tubular structures that include the cutting blades.

Barrel Size

The diameter of the cutting rings and the diameter of the vacuum tube (the barrel) may affect the performance of the pruning system. In some instances, it may be desirable to use barrels with different diameters to accommodate different sized plants. For example, cutting rings with larger diameters may be used for plants with larger foliage. Likewise, cutting rings with smaller diameters may be used for plants with smaller foliage.

The barrel size also may be modified to modify the speed and manner in which plant material is lifted upward by the device. For example, in preferred embodiments, the system may be fitted with circular cutting heads that range from approximately 2 to 10 inches in diameter. Barrels with smaller diameters may allow for smaller leaf coverage and in at least some instances, a more targeted vacuum, while larger diameter barrels may allow for greater leaf coverage and in at least some instances, more a disbursed vacuum. Barrels with smaller diameters may be desirable in instances when more precision is desired; for example, when only particular portions of a plant are identified for removal from a plant. Barrels with larger diameters may be desirable in instances when less precision and a more disbursed vacuum is desired, such as, for example, when large portions of a field are cleaned and maintained.

Pump Speed and Rotation

It may be desirable to adjust the pump speed of the vacuum to allow the movement of more or less plant material upward before or during operation of the device. Optimally, the pump is set at a speed that allows for the creation of a vacuum at a surface of the leaf without breaking or damaging the leaf. Similarly, the speed at which the cutting head rotates may also affect the manner in which plant material may be removed, and the speed of the rotating cutting ring may be adjusted, to facilitate the removal of the different types of plant material.

Timing and Mechanical Operation

The various components of the pruning system may be programmed to operate in different ways to accommodate the removal of different types of plant material. In some instances, the cutting mechanism of the pruning system may be adjusted by adjusting the motion of the vacuum and/or the plant cutting head. For example, the distance moved by the cutting head toward the target plant material may be adjusted to allow for the removal of plant materials at different heights.

The relative timing of the plant cutting heads and/or vacuum may be modified to allow the rotation of the cutting head to begin at different times during operation of the system. For example, in some instances, it may be desirable to apply the vacuum for a longer period of time before the blades are rotated (or to introduce the rotation later) to create a greater lift and allow for the upward pulling of more plant material before the material is cut. This might be useful for plant materials that include longer stems, such as strawberry plant runners. In other instances, it may be practical to prune plant material when the suction and rotating cutting heads are introduced to the plant material at closer times, or the same or substantially the same times.

It will be appreciated that any one or more of the above-described variables may be adjusted, alone or in combination, to tailor the system to accommodate different pruning needs and allow use with different types of plant materials and crops. In addition, the dimensions and operating conditions discussed above are provided as non-limiting examples. It may be appreciated that the speeds and dimensions of the pruning system discussed above, as well as the speeds and diameters of the cutting heads and related components, the cutting rings, barrels, and cutting blades, may vary to accommodate different design considerations, such as different bed widths, lengths, and heights, materials used for construction, ease of fabrication and use, target plant material, desired cutting head and vacuum speeds, and the desired plant coverage capacity of the pruning system.

Vision Systems

The pruning system may be used with a vision system that allows for the identification of the material to be harvested. In some embodiments, the vision system may include one or more cameras and one or more communication networks that work together to allow for the raising and lowering of the pruning system over plant material. The vision camera may allow for the identification of particular types of plant material, such as strawberry fruit, flowers, leaves, runners, and other plant material in a field. The vision system may be programmed to distinguish the strawberry fruit and flowers from the leaves, runners, and other plant material and subsequently direct certain operations, such as the lowering of the cutting head of the pruning system (and rotation of the appropriate cutting blades) over an area when one or more conditions is present or the bypassing of an area when another condition or another set of conditions is present.

In a preferred embodiment, the pruning system and vision system may be built onto a transporting vehicle, such as a tractor. The vehicle includes a tool bar to which one or more robotic arms is attached. The pruning system with a plant cutting head is attached to a robotic arm that is adapted to receive signals from the vision system. As the vehicle moves across a field, pulling one or more robotic arms, the vision system identifies material over which each robotic arm may pass. The bed conditions may vary by growing region, and different growing regions may have different plant bed sizes, different numbers of rows per bed, and different plant spacing. It will be appreciated that the various features of the robotic arms (e.g., the number of robotic arms on a vehicle, the dimensions of each robotic arm, and the speed at which the robotic arms move across the field) may be adjusted to accommodate the bed conditions (e.g., bed sizes, numbers of rows per bed, and plant spacing) of a particular growing region.

The system may be electronically programmed to facilitate automated harvesting of particular types of fruit from a plant bed. When the vision system has identified a particular condition or set of conditions, the communication network may electronically signal that the pruning system perform a particular action. For example, when the vision system has identified an area where plant removal is advantageous or desirable (e.g., an area with strawberry plant leaves and no or fewer strawberry fruit or flowers, or an area with rotten strawberry fruit), the communication network may direct the lowering of the pruning system to allow for the removal of plant material from the area. The pruning system may be lowered toward the plant material such that the leaves are positioned substantially upright through the cutting heads. The leaf portion of the plant is maintained substantially upright using the vacuum, while the stem portion is allowed to enter the open space created by the notches in cutting heads. As the adjacent blades of the plant cutting head converge, the stem portion of the plant material may be severed, while the leaf portion continues through the vacuum source and is allowed to be eventually removed from the vacuum area. The pruning system then may be raised and moved laterally across the field (on the tractor) to allow for further identification and stamping in other areas of the field.

When the vision system has identified another condition or set of conditions, the communication network may electronically signal that the pruning system perform a different action. For example, when the vision system has identified an area where plant removal is not advantageous or no longer desirable (e.g., an area where strawberry fruit or a strawberry flower is present), the communication network may direct movement of the pruning device past the area without removing plant material from the area.

Figure 7:
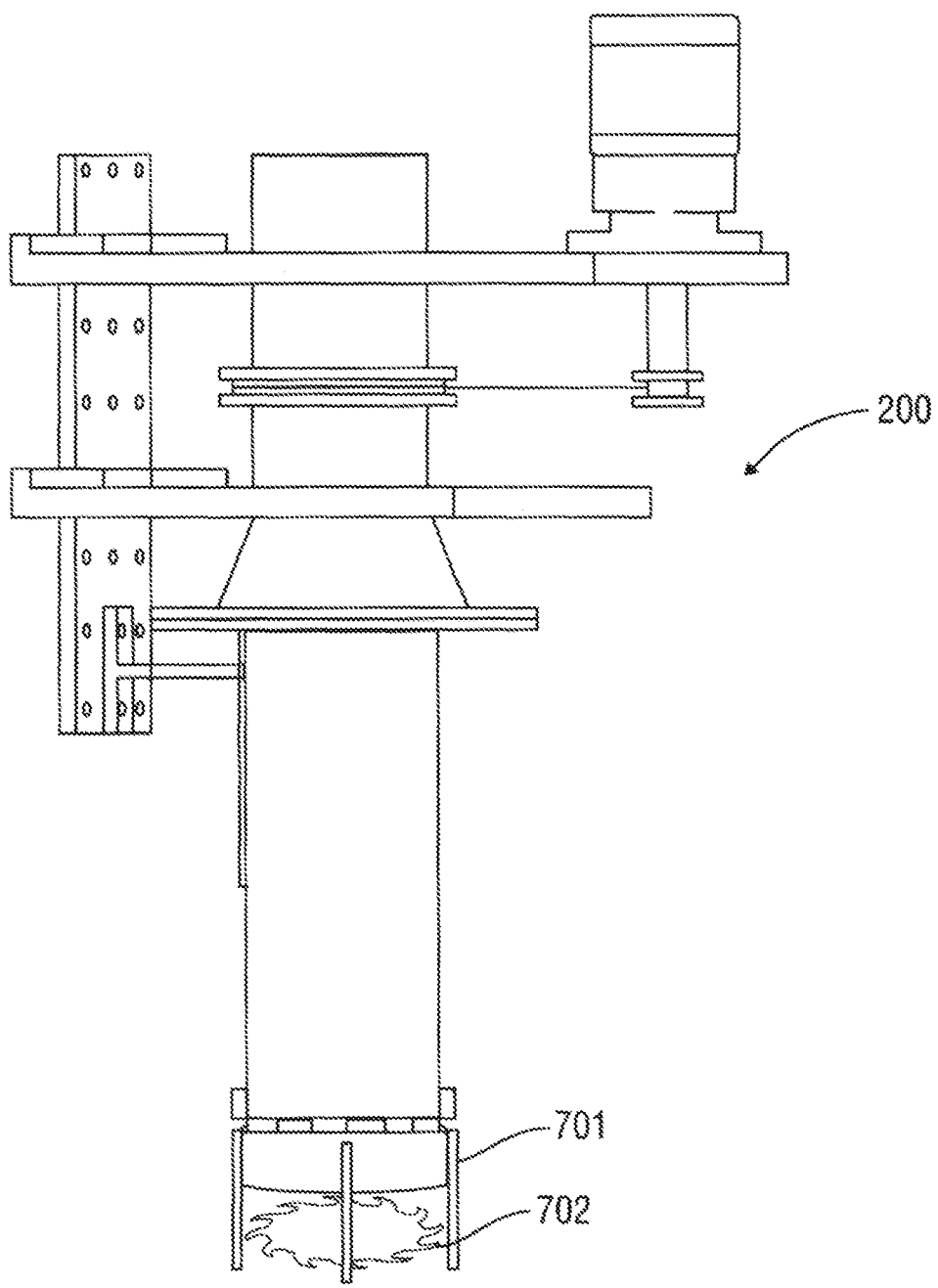
FIG. 7 illustrates schematically in side view various components of an example of a plant pruning system, in accordance with an embodiment of the present invention. The system includes a plurality of knife guards positioned at a bottom portion of the device.
Figure 7:
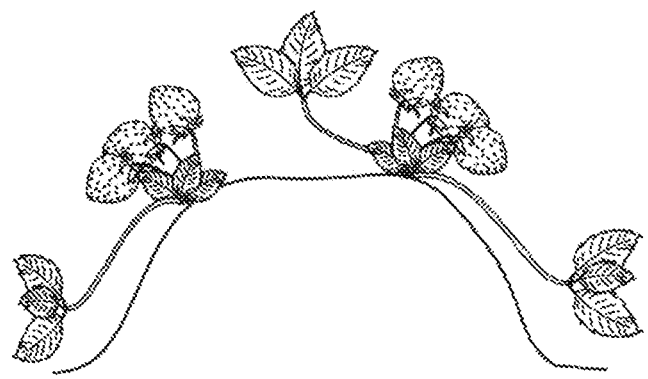

In some embodiments, the pruning system may include one or more structures that facilitates the separation and removal of plant material based on height. For example, the pruning system may be fitted with a comb that is adapted to engage with one or more material based on height. The comb may be adapted to engage with taller or more upright-standing plant material. In this way, at least some of the newer plant material, which may be standing more upright as compared with older growth, may be pushed to the side and protected from removal, while the older growth is removed using the pruning system and cutting head and using the methods described above. In addition, the pruning system may include one or more knife guards that protect the cutting head blades during and between operation, as shown in FIG. 7. In the pruning system 700, knife guards 701 are disposed at a lower portion of the cutting tube to protect the cutting head blades 702.

Although specific systems are described in detail above, the present disclosure provides a range of pruning methods, apparatuses, assemblies, and components, for plant removal and field management. A wide range of field management applications may be addressed using the systems described herein. These include but are not limited to field management of plant beds containing a variety of crops, such as strawberry plants, broccoli, spinach, lettuce, squash, cucumbers, tomatoes, and other plants that may benefit from the removal of foliage.

These are merely illustrative examples of pruning systems and related components in accordance with some embodiments of the invention. While possible device configurations, device couplings, and general component shapes are described and shown in the figures, it is within the scope and contemplation of the disclosure to introduce assemblies in other configurations using different couplings and component shapes. In addition, as known by those of skill in the art, the number of cutting heads, cutting blades, and cutting rings; the dimensions of the cutting heads, cutting blades, and cutting rings; and the number and dimensions of the respective openings may vary to accommodate different design considerations, such as different device widths, lengths, and heights (outside and inside dimensions), desired plant coverage capacity, and device speeds. Any of a multitude of complementary shapes allowing for the removal of plant material through the cutting head and well known to the ordinary artisan could be used.

The construction and orientation of the system parts, components, apparatuses, devices, and assemblies described herein are provided for reference purposes and as non-limiting examples. It will be appreciated that the system parts, components, apparatuses, devices, and assemblies described herein may be constructed in a multitude of different ways to accommodate different design considerations, such as the desired apparatus widths, lengths, and heights, desired plant collection and cutting areas, case of fabrication, and the particularities of the landscaped area in which the pruning system is to be used. For example, components described herein may be constructed by combining multiple parts or separate pieces into a unitary assembly, or the components may be constructed in a one-piece design. Moreover, individual components may be integrated with other components to form one or more singular units.

The structure of the pruning systems described above greatly facilitates the fabrication and construction of plant maintenance devices. Both simple (e.g., a pruning system with a single cutting device head with two cutting blades) and more complex systems (e.g., a pruning system with multiple cutting device heads, plant sorting features, vision systems, and/or transport vehicles) of inter-connected structures can be built for a wide range of field management applications. The variation in the types and features of the different pruning systems allows for customization according to the particular needs of a landscape area.

The ordinary artisan will recognize that materials commonly used in applications involving plant removal can be employed in the present invention. For example, in various embodiments, materials useful for construction of the cutting rings with the cutting blades, include but are not limited to: stainless steel, plastics, or any other materials that can withstand acidic soil conditions. Further, the system and its various components, such as the tubular members, cutting heads, cutting head components, vacuum system, and vision system, may be constructed in a permanently connected design that provides structural integrity. Alternatively, it can be constructed of separate interconnected units or "modules" that can be integrated in a device and are removable and replaceable to provide greater flexibility.

It is contemplated that the dimensions of the pruning system and its various components can vary within a range dependent on one or more design factors including but not limited to: overall system and site configuration, desired plant removal capacity, desired weight of the assemblies, and/or the desired amount of plant material to be managed, the size and structure of overall plants for which assemblies are used, and the overall size and structure of the plant beds in which assemblies are used, and/or the desired access space for inspection, cleaning, and maintenance purposes.

The above disclosures are sufficient to enable one of ordinary skill in the art to practice the invention, and provide the best mode of practicing the invention presently contemplated by the inventor. While there is provided herein a full and complete disclosure of specific embodiments of this invention, it is not desired to limit the invention to the exact construction, dimensional relationships, and operation shown and described. Various modifications, alternative constructions, design options, changes and equivalents will readily occur to those skilled in the art and may be employed, as suitable, without departing from the spirit and scope of the invention. Such changes might involve alternative materials, components, structural arrangements, sizes, shapes, forms, functions, operational features or the like.

What is claimed is:

1. A method of removing plant material comprising the steps of:
   (a) suctioning plant material through a tube assembly fitted with a plurality of upper blades and a plurality of lower blades extending through an interior of the tube assembly, wherein the tube assembly comprises an inner tube and an outer holder disposed around the inner tube; and further wherein the upper blades are disposed at a bottom portion of the inner tube, and the lower blades are disposed at a bottom portion of the outer holder;
   (b) positioning at least a portion of the plant material between adjacent upper and lower blades; and
   (c) rotating at least a portion of the tube assembly to sever at least a portion of the plant material.

2. The method of claim 1, wherein a mounting band connects the upper blades to the inner tube, and the lower blades extend from a base member that is adapted to fit around an end portion of the outer holder.

3. The method of claim 1, wherein the step of (c) rotating at least a portion of the tube assembly to sever at least a portion of the plant material comprises: rotating the inner tube while allowing the outer holder to remain stationary.

4. The method of claim 1, wherein the step of (c) rotating at least a portion of the tube assembly to sever at least a portion of the plant material comprises: rotating the outer holder while allowing the inner tube to remain stationary.

5. The method of claim 1, wherein the tube assembly is adapted to rotate around a longitudinal axis, and the upper blades and lower blades are angled relative to the longitudinal axis.

6. The method of claim 1, wherein a knife guard is adapted to protect the upper and lower blades.

7. The method of claim 1, wherein the tube assembly is fitted with: (i) an upper cutting ring from which the upper blades extend and (ii) a lower cutting ring dimensioned to fit below the upper cutting ring and from which the lower blades extend.

8. The method of claim 1, wherein the step of (b) positioning at least a portion of the plant material between adjacent upper and lower blades comprises: positioning at least a portion of the plant material through an opening defined by adjacent edges of the upper and lower blades.

9. The method of claim 8, wherein the step of (c) rotating at least a portion of the tube assembly to sever at least a portion of the plant material comprises: rotating at least one of the upper or lower blades to allow the adjacent edges of the upper and lower blades to converge and substantially close the opening.

10. A method of removing plant material comprising the steps of:
    (a) suctioning plant material through a tube assembly fitted with:
        (i) an upper cutting ring comprising a plurality of upper blades, and
        (ii) a lower cutting ring dimensioned to fit below the upper cutting ring and comprising a plurality of lower blades;
        wherein the tube assembly comprises an inner tube and an outer holder disposed around the inner tube; and further wherein the upper cutting ring is disposed at a bottom portion of the inner tube, and the lower cutting ring is disposed at a bottom portion of the outer holder;
    (b) positioning at least a portion of the plant material through an opening defined by adjacent edges of the upper and lower blades; and
    (c) rotating at least one of the upper or lower cutting rings to allow the adjacent edges of the upper and lower blades to converge and substantially close the opening, thereby severing at least a portion of the plant material.

11. The method of claim 10, wherein a mounting band connects the upper cutting ring to the inner tube, and the lower cutting ring extends from a base member that is adapted to fit around an end portion of the outer holder.

12. The method of claim 10, wherein the step of (c) rotating at least one of the upper or lower cutting rings to allow the adjacent edges of the upper and lower blades to converge and substantially close the opening, thereby severing at least a portion of the plant material comprises: rotating the inner tube while allowing the outer holder to remain stationary.

13. The method of claim 10, wherein the step of (c) rotating at least one of the upper or lower cutting rings to allow the adjacent edges of the upper and lower blades to converge and substantially close the opening, thereby severing at least a portion of the plant material comprises: rotating the outer holder while allowing the inner tube to remain stationary.

14. The method of claim 10, wherein the upper blades and lower blades are angled relative to the planes formed by opposing outside edges of the upper and lower cutting rings, respectively.

15. The method of claim 10, wherein a knife guard is adapted to protect the upper and lower blades.

16. A method of removing plant material comprising the steps of:
    (a) suctioning plant material through a cutting head assembly comprising:
        (i) an upper cutting ring comprising a plurality of upper blades, wherein the upper cutting ring is connected to an inner tube, and
        (ii) a lower cutting ring disposed below the upper cutting ring and comprising a plurality of lower blades, wherein the lower cutting ring is connected to an outer holder positioned around the inner tube;

(b) positioning plant material through an opening defined by adjacent upper and lower blades; and (c) rotating at least one of the upper or lower cutting rings to allow the adjacent upper and lower blades to converge to substantially close the opening and sever at least a portion of the plant material.

17. The method of claim 16, wherein a mounting band connects the upper cutting ring to the inner tube, and the lower cutting ring extends from a base member that is adapted to fit around an end portion of the outer holder.

18. The method of claim 16, wherein the step of (c) rotating at least one of the upper or lower cutting rings to allow the adjacent upper and lower blades to converge to substantially close the opening and sever at least a portion of the plant material comprises: rotating the inner tube while allowing the outer holder to remain stationary.

19. The method of claim 16, wherein the step of (c) rotating at least one of the upper or lower cutting rings to allow the adjacent upper and lower blades to converge to substantially close the opening and sever at least a portion of the plant material comprises: rotating the outer holder while allowing the inner tube to remain stationary.

20. The method of claim 16, wherein the upper blades and lower blades are angled relative to the planes formed by opposing outside edges of the upper and lower cutting rings, respectively.

21. The method of claim 16, wherein a knife guard is adapted to protect the cutting head assembly.

\* \* \* \* \*